(12) United States Patent
Park et al.

(10) Patent No.: US 11,120,330 B2
(45) Date of Patent: Sep. 14, 2021

(54) ACCELERATOR IN CONVOLUTIONAL NEURAL NETWORK AND METHOD FOR OPERATING THE SAME

(71) Applicant: Samsung Electronics Co., Ltd., Gyeonggi-do (KR)

(72) Inventors: Younghwan Park, Yongin-si (KR); Kyounghoon Kim, Suwon-si (KR); Seungwon Lee, Hwaseong-si (KR); Hansu Cho, Hwaseong-si (KR); Sukjin Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 875 days.

(21) Appl. No.: 15/662,225

(22) Filed: Jul. 27, 2017

(65) Prior Publication Data

US 2018/0032859 A1    Feb. 1, 2018

(30) Foreign Application Priority Data

Jul. 27, 2016    (KR) .................. 10-2016-0095246

(51) Int. Cl.
*G06F 15/76*    (2006.01)
*G06N 3/063*    (2006.01)
*G06N 3/04*    (2006.01)

(52) U.S. Cl.
CPC ............... *G06N 3/063* (2013.01); *G06N 3/04* (2013.01); *G06N 3/0454* (2013.01)

(58) Field of Classification Search
CPC ......... G06F 13/00; G06F 15/76; G06N 3/063; G06N 3/04; G06N 3/0454
See application file for complete search history.

(56) References Cited

U.S. PATENT DOCUMENTS

| | | | |
|---|---|---|---|
| 7,219,085 B2 | 5/2007 | Buck et al. | |
| 8,442,927 B2 | 5/2013 | Chakradhar et al. | |
| 10,291,813 B2* | 5/2019 | Meixner | B41F 15/0804 |
| 10,671,349 B2* | 6/2020 | Bannon | G06T 1/20 |
| 2015/0371359 A1 | 12/2015 | Wu et al. | |

(Continued)

OTHER PUBLICATIONS

European Search Report dated Dec. 21, 2017 in connection with European Patent Application No. 17 18 3554.

(Continued)

*Primary Examiner* — Cheng Yuan Tseng

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A Processing Element (PE) implemented in an accelerator in a convolutional neural network, which includes a first buffer configured to transfer input data to one other PE, and a second buffer configured to transmit to an outside output data that is processed on the basis of the input data; and an operation unit configured to generate output data.

14 Claims, 13 Drawing Sheets

(56) References Cited

U.S. PATENT DOCUMENTS

2016/0379109 A1* 12/2016 Chung ................ G06F 15/7803
            706/26
2017/0316312 A1* 11/2017 Goyal ....................... G06F 7/48

OTHER PUBLICATIONS

Zidong Du et al., "ShioDianNao: Shifting Vision Processing Closer to the Sensor", Jun. 17, 2015, 13 pages.
Yifan He et al., "A Configurable SIMD Architecture with Explicit Datapath for Intelligent Learning", Jul. 17, 2016, 8 pages.
Atul Rahman et al., "Efficient FPGA Acceleration of Convolutional Neural Networks Using Logical-3D Compute Array", Mar. 14, 2016, 6 pages.

* cited by examiner

ACCELERATOR IN CONVOLUTIONAL NEURAL NETWORK AND METHOD FOR OPERATING THE SAME

CROSS-REFERENCE TO RELATED APPLICATION

The present application is related to and claims benefit under 35 U.S.C. 119(a) of a Korean patent application filed on Jul. 27, 2016 in the Korean Intellectual Property Office and assigned Serial No. 10-2016-0095246, the entire disclosure of which is hereby incorporated by reference.

TECHNICAL FIELD

The present disclosure relates to an accelerator only for a convolutional neural network, and more particularly, to a method and a device capable of performing pooling of a multilayer to minimize accesses to an external memory.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Recently, advances have been actively made in a method and a structure capable of greatly reducing the amount of memory usage and memory accesses that are required in a convolutional neural network that is one field of deep learning for providing high performance in the fields of vision-based object recognition and voice recognition.

Recognition applications based on deep learning have been performed in a Graphic Processing Unit (GPU) that is specialized in processing 3D graphics. In a method for using a memory of a GPU, for example, if it is assumed that energy of "1" is necessary for a processor to access an internal Register File (RF), energy of "10" may be consumed in accessing to an internal buffer (e.g., on-chip SRAM), and energy of "500" may be consumed for an external memory (e.g., off-chip DRAM). That is, in order to reduce the energy in the method for using the memory of the GPU, it is an important point to minimize accesses to the external memory.

The GPU uses a well-known General Matrix to Matrix Multiplication (GEMM) technique in order to improve the efficiency of parallel processing that is necessary for deep learning. That is, the GPU converts an input image in the form of a 3D array into that in the form of a 2D array for being processed through a matrix operation, and performs a multiplication operation of a constant value for each kernel and a matrix. In this process, an overlapping portion of the input image is copied into the memory to be repeatedly stored, and this causes waist of a memory storage space and unnecessary memory accesses. Such accesses to the external memory finally bring the waste of energy.

According to a recently proposed accelerator only for a convolutional neural network, a method and a structure, which can minimize accesses to an external memory through a maximum reuse of input image data that is read from the external memory having relatively large energy consumption in the accelerator, are being proposed.

To address the above-discussed deficiencies, it is a primary object to provide a method and a device which can reduce the overall power consumption by reducing accesses to an external memory for read/write of intermediate resultant values that are generated for each layer through performing of pooling of a multilayer in a convolutional neural network.

In accordance with an embodiment of the present disclosure, a Processing Element (PE) implemented in an accelerator in a convolutional neural network includes a first buffer configured to transfer input data to one other PE; a second buffer configured to transmit to an outside output data that is processed on the basis of the input data; and an operation unit configured to generate intermediate data by performing a first operation with respect to the input data, to store the intermediate data in the second buffer, to generate the output data by performing a second operation with respect to the intermediate data that is fed back from the second buffer, and to store the output data in the second buffer.

In this case, each of the first operation and the second operation may be related to at least one of a convolution layer, a non-linear layer, and a normalization layer.

In accordance with another embodiment of the present disclosure, an accelerator in a convolutional neural network includes a plurality of Processing Elements (PEs). Each of the plurality of PEs includes a first buffer configured to transfer input data to one other PE; a second buffer configured to transmit to an outside output data that is processed on the basis of the input data; and an operation unit configured to generate intermediate data by performing a first operation with respect to the input data, to store the intermediate data in the second buffer, to generate the output data by performing a second operation with respect to the intermediate data that is fed back from the second buffer, and to store the output data in the second buffer.

The accelerator may further include a third buffer, and a pooling unit configured to receive plural pieces of output data that are transmitted from the plurality of PEs, and to perform a pooling operation with respect to the plural pieces of output data to transmit the output data to the third buffer.

The accelerator may further include a buffer controller configured to control the third buffer to transmit final data that is accumulated in the third buffer to an external memory if the final data is equal to or larger than a predetermined size.

The plurality of PEs may be grouped into a predetermined matrix form. According to the embodiment, the grouped PEs may share one pooling unit.

According to the embodiment, at least one of the plurality of PEs may further includes a pooling unit configured to receive adjacent output data from the adjacent PEs, and to perform a pooling operation with respect to the adjacent output data and the output data stored in the second buffer.

The accelerator may be controlled in accordance with a command from an external processor.

The output data may be transmitted to any one of any one of the plurality of PEs, the pooling unit, and the external memory.

In accordance with still another embodiment of the present disclosure, a method for operating an accelerator that includes a plurality of Processing Elements (PEs) in a convolutional neural network includes storing input image in a first buffer and transferring the input data to one other PE; generating intermediate data by performing a first operation with respect to the input data, and storing the intermediate data in a second buffer; generating output data by performing a second operation with respect to the intermediate data that is fed back from the second buffer, and storing the output data in the second buffer; and outputting the output data from the second buffer to an outside.

According to the accelerator in the convolutional neural network and the method for operating the same according to embodiments of the present disclosure, accesses to the external memory for reading and writing the intermediate resultant values that are generated for the respective layers can be reduced through performing of pooling of the multilayer, and thus the overall power consumption can be reduced.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
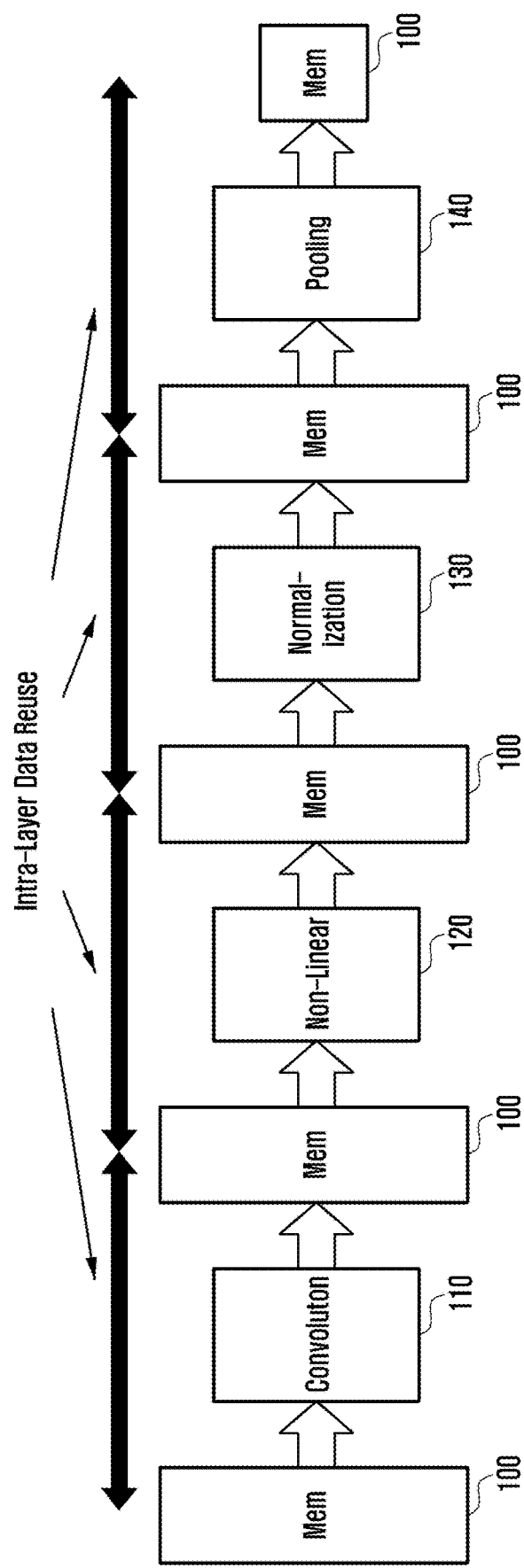
FIG. 1 illustrates a diagram explaining the operation of an accelerator by layers and memory input/output in a convolutional neural network.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, preferred embodiments of the present disclosure will be described in detail with reference to the accompanying drawings. In this case, it should be noted that the same drawing reference numerals are used for the same constituent elements across various figures. Further, a detailed explanation of known functions and configurations that may obscure the subject matter of the present disclosure will be omitted.

In explaining embodiments of the present disclosure, explanation of technical contents which are well known in the art to which the present disclosure pertains and are not directly related to the present disclosure will be omitted. This is to transfer the subject matter of the present disclosure more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the present disclosure and methods for achieving the aspects and features will be apparent by referring to the embodiments to be described in detail with reference to the accompanying drawings. However, the present disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable data processing apparatus to produce a computer implemented process such that the instructions that execute on the computer or other programmable data processing apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~unit", as used in an embodiment, means, but is not limited to, a software or hardware component, such as FPGA or ASIC, which performs certain tasks. However, "~unit" does not mean to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more CPUs in a device or a security multimedia card.

FIG. 1 illustrates a diagram explaining the operation of an accelerator by layers and memory input/output in a convolutional neural network.

According to an accelerator only for a convolutional neural network, an embodiment illustrating a method and a structure, which can minimize accesses to an external memory through a maximum reuse of input image data that is read from the external memory having relatively large energy consumption in the accelerator, are being proposed.

The accelerator only for a convolutional neural network is featured so that Processing Elements (PEs) for performing an operation with respect to input data are arranged in the form of a 2D array. As the PEs are arranged in the form of a 2D array, the input data is transferred between upper and lower PEs or left and right PEs, and thus it can be reused.

The PEs may perform the operation for parallel processing of data levels through the maximal use of the characteristic that input image or feature map data are reused during a convolution operation.

Each PE mainly performs a Multiplication And Accumulation (MAC) function for performing the convolution operation, and includes an internal buffer for storage of accumulated intermediate values and temporary storage of data during data transmission of neighboring PEs.

FIG. 1 illustrates a method in which an accelerator only for a neural network reuses data in layers.

Referring to FIG. 1, a typical convolutional neural network is structured to repeatedly performing a convolutional layer 110, a non-linear layer 120, a normalization layer 130, and a pooling layer 140. In the repeated process of each layer, input data is read from an external memory 100, an operation of the corresponding layer is performed, and then the resultant values are written in the external memory 100. In the process as described above, unnecessary input/output operations are repeatedly performed through the external memory 100. In this case, the normalization layer 130 may be implemented by a Rectified Linear Unit (ReLU), hyperbolic Tangent (Tanh), and sigmoid functions.

The reason of the above-described process is as follows. During learning of a convolutional neural network, constant values are continuously adjusted in a direction in which resultant errors are minimized through a technique so called back propagation. In this process, intermediate values should be stored in the memory, and thus separation between layers is essential. If pooling of layers is performed, information on the intermediate values may disappear to cause learning not to be performed. Accordingly, GPU-based tool and library have been developed to perform separate processing by layers.

Figure 2:
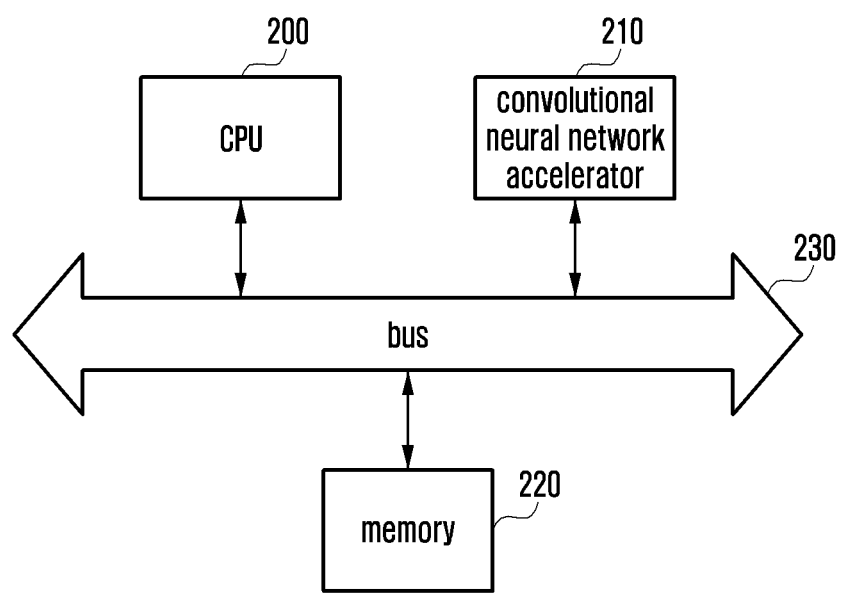
FIG. 2 illustrates a block diagram illustrating the configuration of an electronic device according to an embodiment of the present disclosure.

FIG. 2 illustrates a block diagram illustrating the configuration of an electronic device according to an embodiment of the present disclosure.

Referring to FIG. 2, an electronic device includes a Central Processing Unit (CPU) 200, a convolutional neural network accelerator 210, a memory 220, and a bus 230.

Through the bus 230, the CPU 200 may control the operation of at least one of the convolutional neural network accelerator 210 and the memory 220. The CPU 200 may be implemented by a processor or a multi-core processor.

The convolutional neural network accelerator 210 illustrates a device that can generate a feature map through extraction of features of input data and can perform inference for the input data through reduction of the size of the feature map. In particular, the convolutional neural network accelerator 210 repeatedly performs a convolution operation for generating the feature map.

The convolutional neural network accelerator 210 may be configured by arranging Processing Elements (PEs) for performing operations with respect to the input data in the form of a 2D array. The PEs may mainly perform a Multiplication And Accumulation (MAC) function for performing the convolution operation, and includes an internal buffer for storage of accumulated intermediate values and temporary storage of data during data transmission of neighboring PEs.

The memory 220 may be implemented by, for example, a Dynamic Random Access Memory (DRAM) or a flash memory.

Figure 3:
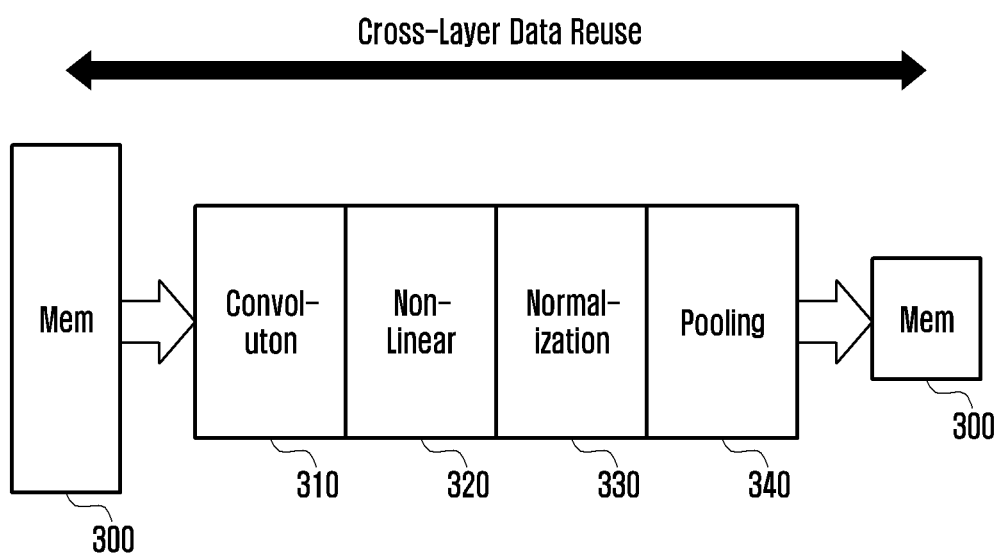
FIG. 3 illustrates a diagram explaining the operation of an accelerator by layers and memory input/output in a convolutional neural network according to an embodiment of the present disclosure.

FIG. 3 illustrates a diagram explaining the operation of an accelerator by layers and memory input/output in a convolutional neural network according to an embodiment of the present disclosure.

FIG. 3 depicts a method in which an accelerator only for a neural network reuses data between layers Referring to FIG. 3, an accelerator in a convolutional neural network according to an embodiment of the present disclosure proposes a method for minimizing accesses to an external memory 300 in a manner that it performs pooling of a convolution layer 310, a non-linear layer 320, and a normalization layer 330, performs a pooling operation 340 after completing processing of all the operational results, and then accesses to the external memory 300 for storage of output values. In this case, the pooling operation is performed to greatly reduce the size of data to be written in the memory against the input data due to the operation characteristic for reducing the size of a feature map.

For layer fusion as described above, Processing Elements (PEs) in the accelerator include corresponding operation functions for respective layer processing, and temporarily store calculated intermediate values in an internal buffer rather than the external memory 300, and thus unnecessary input/output operations through the external memory 300 can be removed.

In this case, the pooling operation is to reduce the size of a given input image, and may mean a max pooling operation for selecting a PE having the max operation value among a plurality of PEs in a predetermined matrix form (e.g., 2×2), or an average pooling operation for calculating an average operation value of the plurality of PEs in the predetermined matrix form (e.g., 2×2).

For example, the pooling unit (or pooler) that is implemented in the PE outputs a max (or average) resultant value against 4 pieces of input data through a comparator that is configured in the form of an internal tree. The pooled values are accumulated in an out buffer in good order, and if they reach a predetermined size, they are transmitted to the external memory to minimize unnecessary memory accesses. Here, since training is not possible during the pooling of respective layers, it becomes necessary to separate a library and a tool for training and inference from each other for application of the layer pooling technology.

Figure 4:
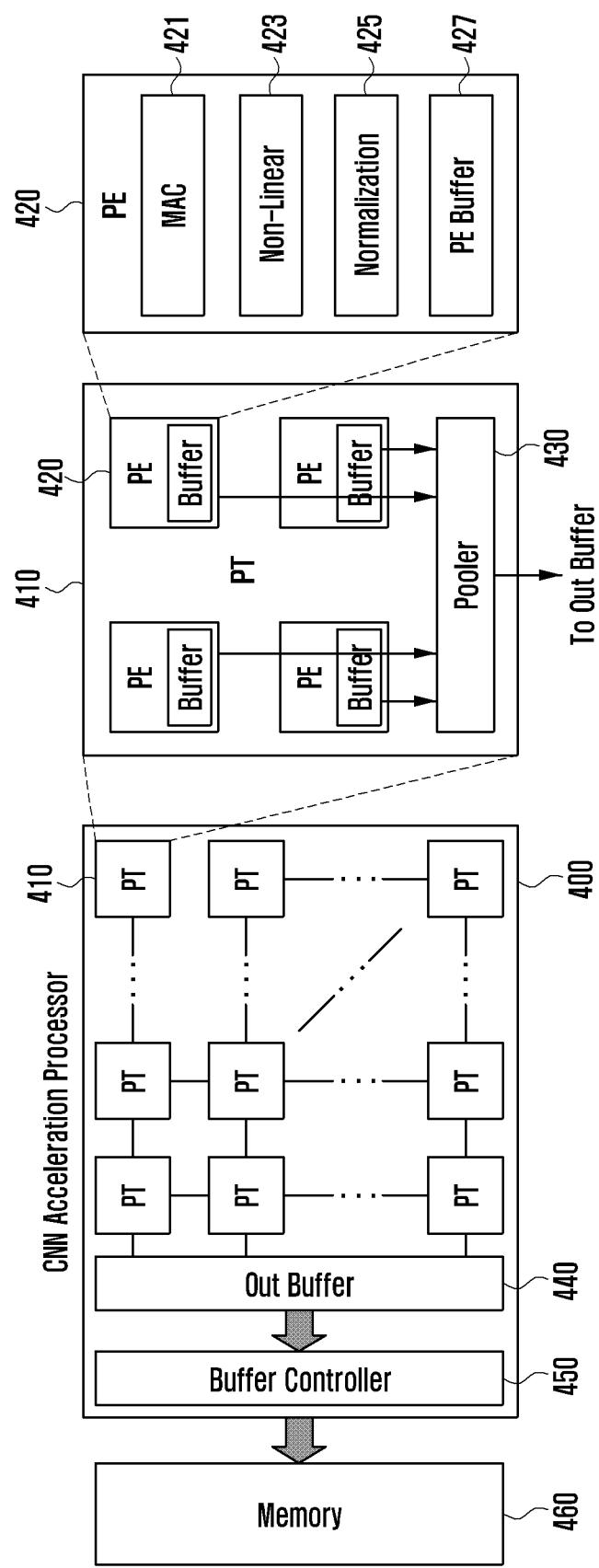
FIG. 4 illustrates a block diagram illustrating the structure of an accelerator in a convolutional neural network according to an embodiment of the present disclosure.

FIG. 4 illustrates a block diagram illustrating the structure of an accelerator in a convolutional neural network according to an embodiment of the present disclosure.

Referring to FIG. 4, in a convolutional neural network, an accelerator 400 includes a plurality of Processing Tiles (PTs) 410, an out buffer 440, and a buffer controller 450. In this case, each of the plurality of PTs may include a plurality of Processing Elements (PEs) 420 and a pooler 430, and each of the plurality of PEs may include a Multiplication And Accumulation (MAC) unit 421, a non-linear unit 423, a normalization unit 425, and a PE buffer 427.

That is, as illustrated in FIG. 4, the structure of a neural network accelerator proposed in the present disclosure is composed of PTs 410 that are arranged in the form of a 2D array, an out buffer 440 for temporarily storing resultant values, and a buffer controller 450 for transmitting the resultant values stored in the out buffer 440 to an external memory 460.

The PT 410 is configured through clustering of a plurality of PEs (e.g., 4 PEs), and includes a separate pooler 430 for a pooling operation. However, according to another embodiment, the pooler 430 may be implemented in the PE 420 to perform the pooling operation.

Each PE 420 includes operation units 421, 423, and 425 that are necessary to process most layers of the convolutional neural network and a PE buffer 427. That is, the PE 420 may include a MAC unit 421 for a convolution operation, a non-linear unit 423 for a non-linear operation, and a normalization unit 425 for a normalization operation. Further, the PE 420 may include a PE buffer 427 for data accumulation and data internal reuse.

The MAC unit 421 may perform a convolution operation whereby input image data is multiplied by constant values and all the resultant values are accumulatively added.

The non-linear unit 423 may perform a non-linear activation operation of the convolutional neural network. The non-linear activation operation corresponds to a Rectified Linear Unit (ReLU), a hyperbolic Tangent (Tanh), or a sigmoid function, and recently, the ReLU has been widely used due to simplicity of operations and various advantages. Accordingly, the remaining Tanh and sigmoid operators may be removed according to circumstances.

The normalization unit 425 takes charge of operation processing of a normalization layer, but it may be omitted (or removed) according to an embodiment.

The pooler 430 may select the max pooling value among data provided from the plurality of PEs that constitute the PT 410, or may operate and output an average pooling value of the data provided from the plurality of PEs that constitute the PT 410.

The resultant values of the operations by the PEs 420 are temporarily stored in the out buffer 440, and if they reach a predetermined size, they are transmitted to the external memory 460 under the control of the buffer controller 450.

Figure 5:
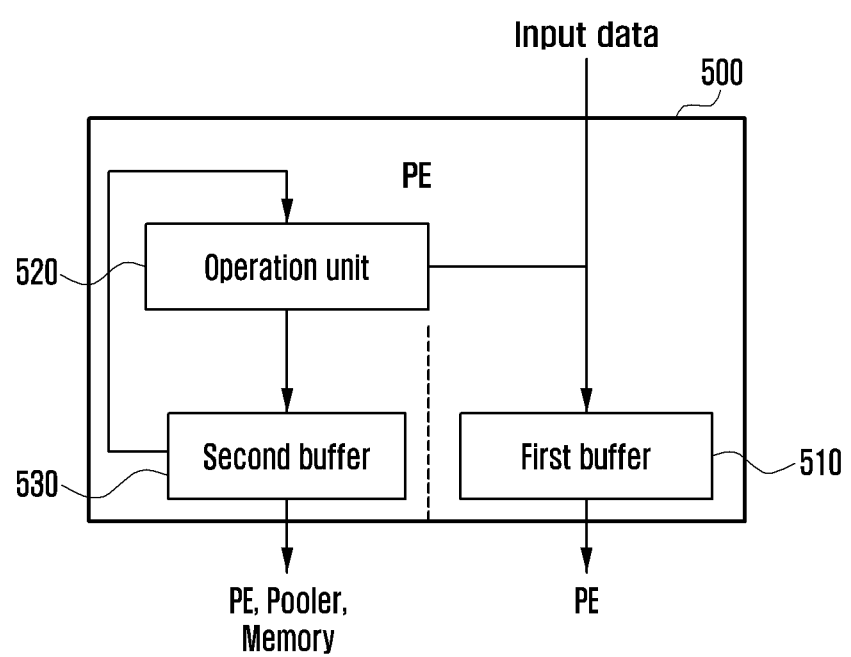
FIG. 5 illustrates a diagram explaining the operation of an accelerator in a convolutional neural network according to an embodiment of the present disclosure.

FIG. 5 illustrates a diagram explaining the operation of an accelerator in a convolutional neural network according to an embodiment of the present disclosure.

In a convolutional neural network, an accelerator may include a plurality of Processing Elements (PEs). The accelerator may be controlled in accordance with a command from an external processor. Further, the plurality of PEs may be grouped into a predetermined matrix form (e.g., 2×2 or 3×3 matrix).

The PE 500 that is one of the plurality of PEs includes a first buffer 510, an operation unit 520, and a second buffer 530. In another embodiment, the first buffer 510 and the second buffer 530 may be implemented as one buffer like the PE buffer 427 in FIG. 4.

The first buffer 510 may receive input data from an external memory or another adjacent PE to store the input data, and may transmit the input data to still another adjacent PE.

The operation unit may generate intermediate data by performing a first operation with respect to the input data, and may store the intermediate data in the second buffer 530. The operation unit 520 may generate output data by performing a second operation with respect to the intermediate data that is fed back from the second buffer 530, and may store the output data in the second buffer 530.

In this case, each of the first operation and the second operation may be related to at least one of a convolution layer, a non-linear layer, and a normalization layer.

According to an embodiment, the operation unit 520 may process the convolution layer for the input data, generate the intermediate data as the result of the processing, and store the intermediate data in the second buffer 530. The operation unit 520 may process the non-linear layer for the intermediate data that is fed back from the second buffer 530, generate the output data as the result of the processing, and store the output data in the second buffer 530. In this case, the operation unit 520 may omit the processing of the normalization layer.

According to another embodiment, the operation unit 520 may process the convolution layer for the input data, generate first intermediate data as the result of the processing, and store the intermediate data in the second buffer 530. The operation unit 520 may process the non-linear layer for the first intermediate data that is fed back from the second buffer 530, generate second intermediate data as the result of the processing, and store the second intermediate data in the second buffer 530. The operation unit 520 may process the normalization layer for the second intermediate data that is fed back from the second buffer 530, generate the output data as the result of the processing, and store the output data in the second buffer 530.

The second buffer 530 may output the output data to any one of any one of the plurality of PEs, the pooling unit, and the external memory.

The accelerator may further include a pooling unit that receives plural pieces of output data that are transmitted from the plurality of PEs, and performs a pooling operation with respect to the plural pieces of output data to transmit the output data to a third buffer.

In this case, under the control of the buffer controller, the third buffer may transmit final data that is transmitted from the pooling unit to the external memory if the final data is equal to or larger than a predetermined size.

According to an embodiment, the plurality of PEs may be grouped into a predetermined form, and one pooling unit may be shared by the grouped PEs.

According to another embodiment, at least one of the plurality of PEs may further include a pooling unit that receives adjacent output data from the adjacent PEs and performs a pooling operation with respect to the adjacent output data and the output data stored in the first buffer. That is, a part of the plurality of PEs may further include a pooling unit provided therein to further perform a pooling operation.

Figure 6:
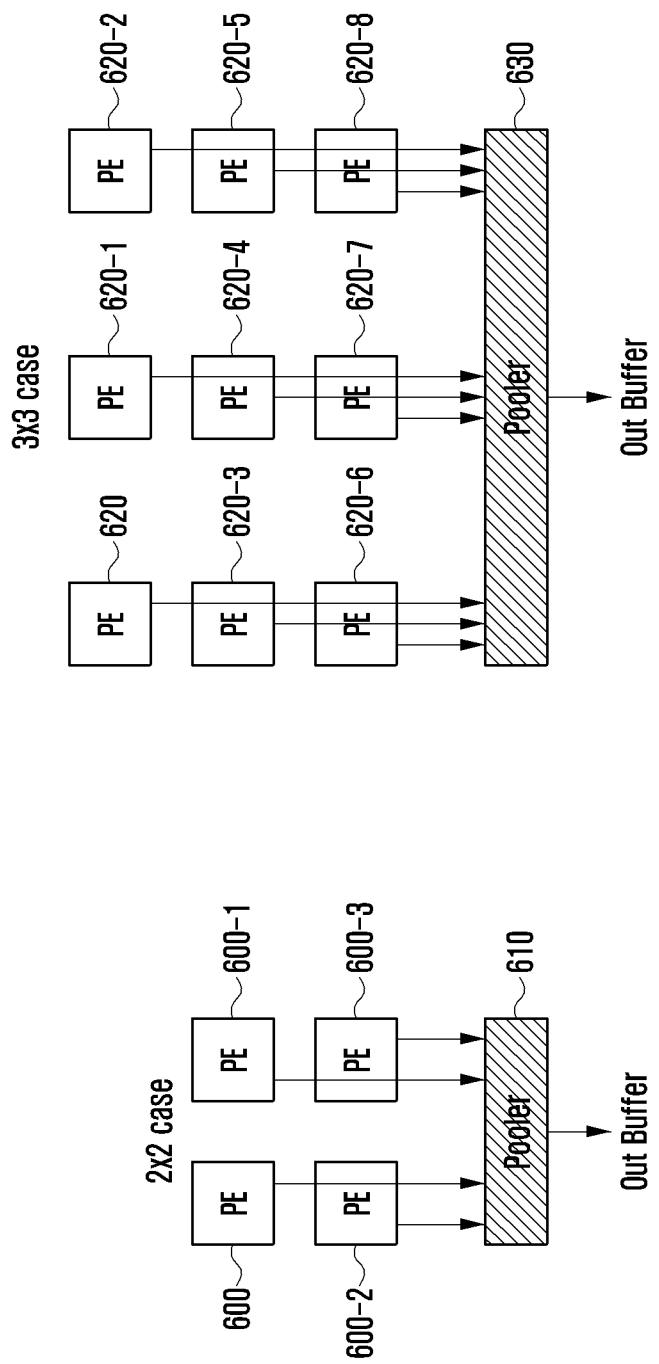
FIG. 6 illustrates a diagram explaining a method in which a Processing Element (PE) performs a pooling operation according to an embodiment of the present disclosure.

FIG. 6 illustrates a diagram explaining a method in which a Processing Element (PE) performs a pooling operation according to an embodiment of the present disclosure.

FIG. 6 is a diagram explaining a method in which each of a plurality of PEs does not include a pooling unit (or pooler) therein, and performs a pooling operation through a separate pooling unit that is implemented on an outside.

If a plurality of PEs 600 to 600-3 are grouped into a 2×2 matrix form, plural pieces of output data that are transmitted from the plurality of PEs 600 to 600-3 are transmitted to a pooling unit 610 that is implemented on an outside, and the pooling unit 610 may perform a pooling operation with respect to the plural pieces of output data.

In this case, the pooling operation is to reduce the size of the plural pieces of output data, and may mean a max pooling operation for selecting a PE having the max operation value among a plurality of PEs in a 2×2 matrix form, or an average pooling operation for calculating an average operation value of the plurality of PEs in a 2×2 matrix form.

Further, if a plurality of PEs 620 to 620-8 are grouped into a 3×3 matrix form, plural pieces of output data that are transmitted from the plurality of PEs 620 to 620-8 are transmitted to a pooling unit 630 that is implemented on an outside, and the pooling unit 630 may perform a pooling operation with respect to the plural pieces of output data.

In this case, the pooling operation is to reduce the size of the plural pieces of output data, and may mean a max pooling operation for selecting a PE having the max operation value among a plurality of PEs in a 3×3 matrix form, or an average pooling operation for calculating an average operation value of the plurality of PEs in a 3×3 matrix form.

In the present disclosure, even if a stride is smaller than a pooling size, intermediate operation values are shared between adjacent PEs, and thus the pooling operation can be performed with respect to all pooling sizes and all strides.

Figure 7:
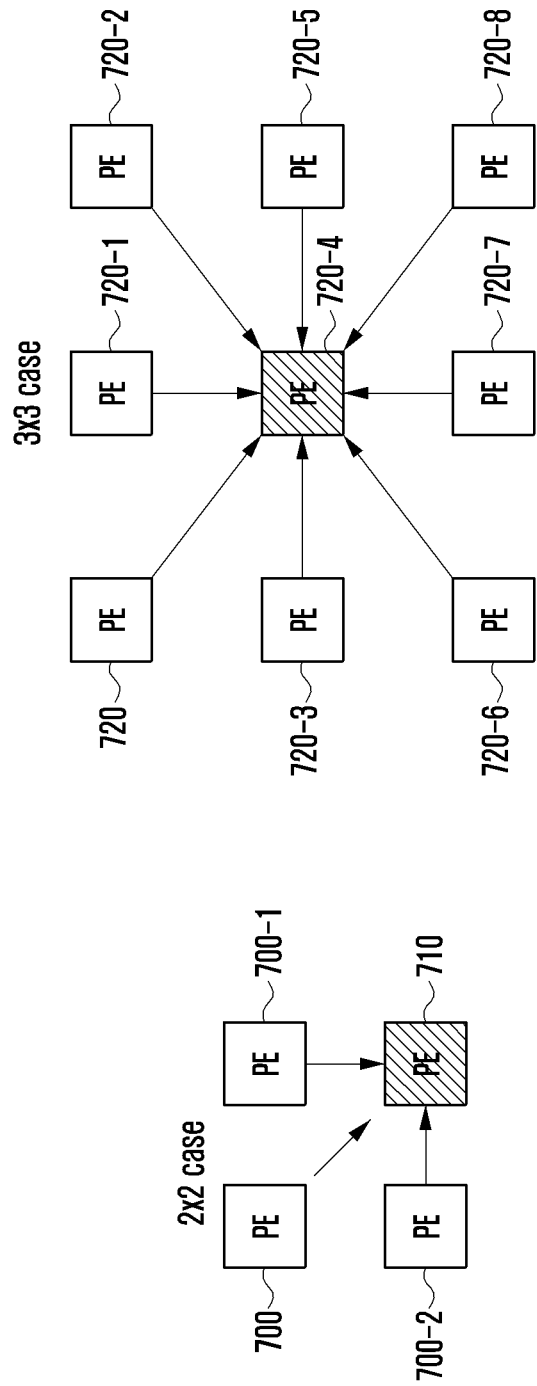
FIG. 7 illustrates a diagram explaining a method in which a Processing Element (PE) performs a pooling operation according to another embodiment of the present disclosure.

FIG. 7 illustrates a diagram explaining a method in which a Processing Element (PE) performs a pooling operation according to another embodiment of the present disclosure.

FIG. 7 depicts a diagram explaining a method in which any one of a plurality of PEs includes a pooling unit (or pooler) therein, and performs a pooling operation through the pooling unit. In this case, a PT 410 (in FIG. 4) that includes a predetermined number of PEs among the plurality of PEs may not include a separate pooling unit.

If a plurality of PEs 700 to 710 are grouped into a 2×2 matrix form, and a pooling unit is implemented in a specific PE 710, plural pieces of output data that are transmitted from the remaining PEs 700 to 700-2 are transmitted to a pooling unit that is implemented in the specific PE 710, and the pooling unit may perform a pooling operation with respect to the plural pieces of output data.

Further, if a plurality of PEs 720 to 720-8 are grouped into a 3×3 matrix form and a pooling unit is implemented in a specific PE 720-4, plural pieces of output data that are transmitted from the remaining PEs 720, to 720-3, and 720-5 to 720-8 are transmitted to the pooling unit that is implemented in the specific PE 720-4, and the pooling unit may perform a pooling operation with respect to the plural pieces of output data.

Figure 8:
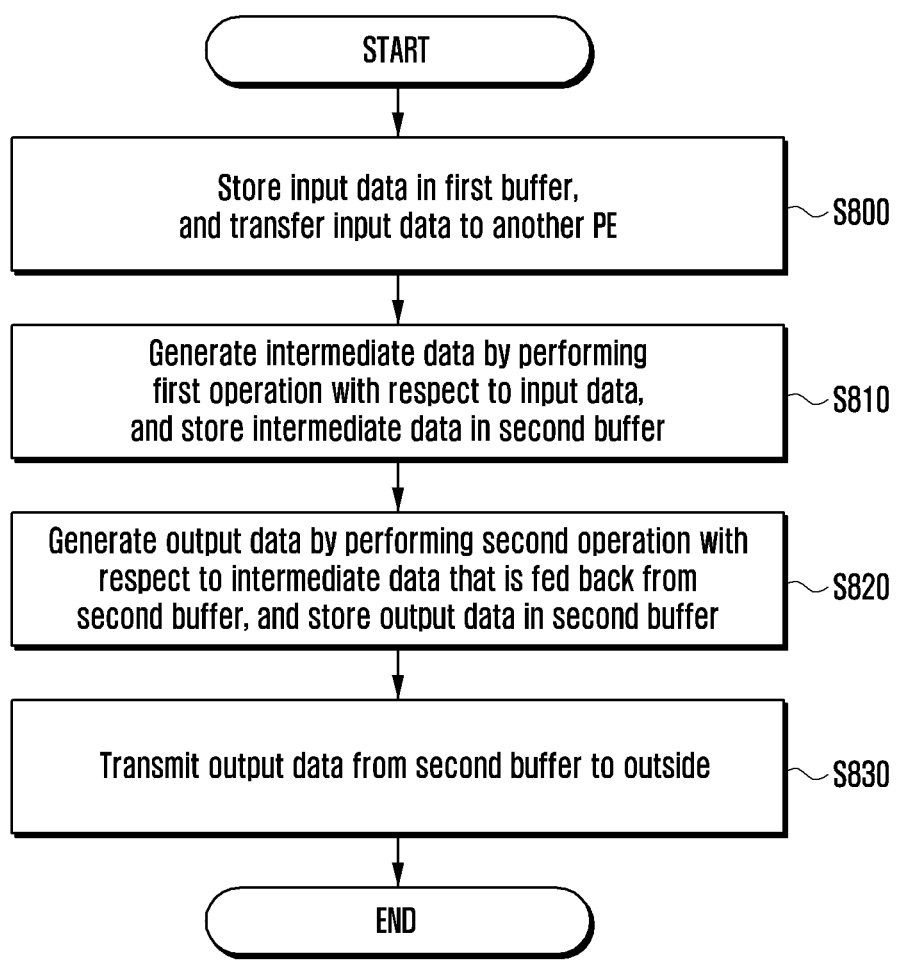
FIG. 8 is a flowchart illustrating a method for operating an accelerator in a convolutional neural network according to an embodiment of the present disclosure.

FIG. 8 is a flowchart illustrating a method for operating an accelerator in a convolutional neural network according to an embodiment of the present disclosure.

In a convolutional neural network, an accelerator may store input data in a first buffer that is implemented in a specific Processing Element (PE) of the accelerator, and may transfer the input data to another PE (S800).

The accelerator may generate intermediate data by performing a first operation with respect to the input data, and may store the intermediate data in a second buffer that is implemented in the specific PE (S810). The accelerator may generate output data by performing a second operation with respect to the intermediate data that is fed back from the second buffer, and may store the output data in the second buffer (S820).

Each of the first operation and the second operation may be related to at least one of a convolution layer, a non-linear layer, and a normalization layer.

The accelerator may transmit the output data from the second buffer to any one of any one of a plurality of PEs, a pooling unit, and an external memory (S830). In this case, the pooling unit may be implemented in at least one of the plurality of PEs or on an outside of the PE.

Figure 9:
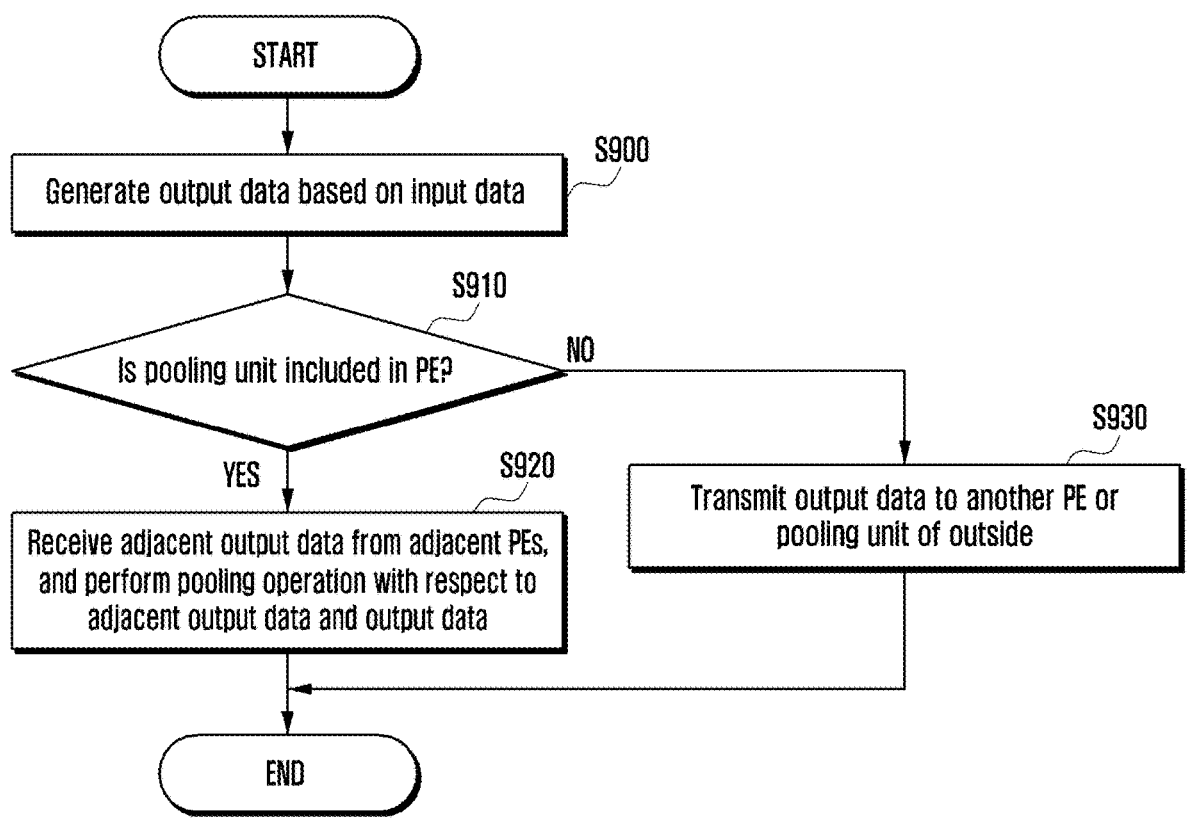
FIG. 9 is a flowchart illustrating a method in which a PE performs a pooling operation according to an embodiment of the present disclosure.

FIG. 9 is a flowchart illustrating a method in which a PE performs a pooling operation according to an embodiment of the present disclosure.

In a convolutional neural network, a Processing Element (PE) implemented in an accelerator may generate output data based on input data (S900).

The PE may determine whether a pooling unit (or pooler) is included in the PE (S910), and may perform a pooling operation in different methods.

If the pooling unit is included in the PE, the PE may receive adjacent output data from adjacent PEs, and may perform a pooling operation with respect to the adjacent output data and the output data (S920).

If the pooling unit is not included in the PE, the PE may transmit the output data to another PE or a pooling unit that is implemented on an outside (S930).

Figure 10A:
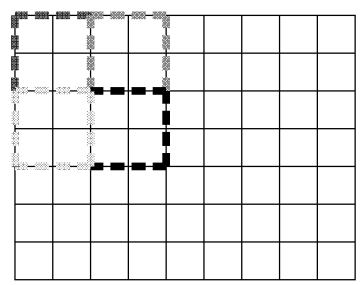
FIGS. 10a and 10b illustrate a diagram explaining a method in which a PE performs a pooling operation if a pooling size and a stride are equal to each other according to an embodiment of the present disclosure.
Figure 10A:
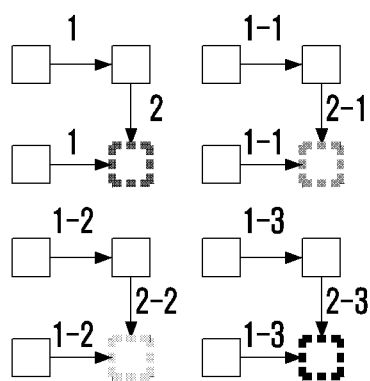
Figure 10B:
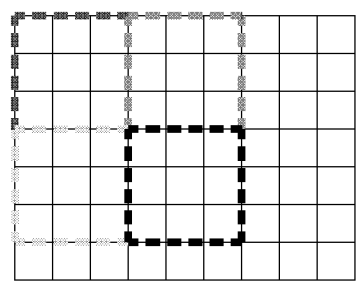
Figure 10B:
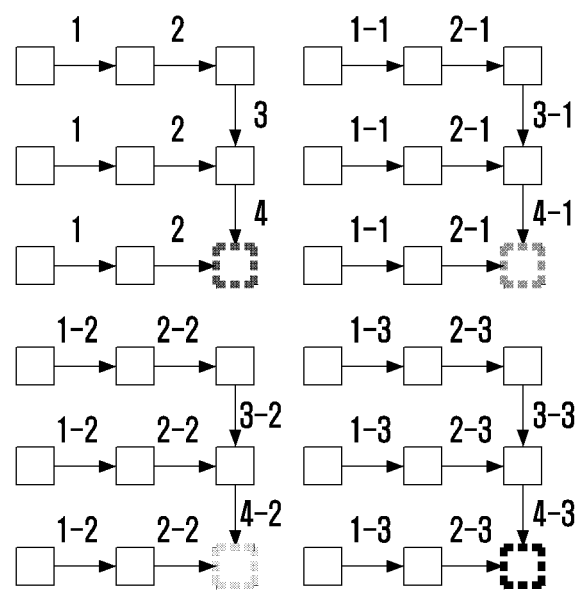

FIGS. 10a and 10b illustrate a diagram explaining a method in which a PE performs a pooling operation if a pooling size and a stride are equal to each other according to an embodiment of the present disclosure.

For example, in FIG. 10a, if a pooling size is 2×2, and a stride is 2, each of a plurality of PEs may transfer output data to a specific PE that includes a pooling unit. In this case, each of the plurality of PEs may transfer the output data to an adjacent PE once at the minimum to twice at the maximum (1, 2/(1-1), (2-1)/(1-2), (2-2)/(1-3), and 2-3), and the specific PE may generate one piece of output data by performing a pooling operation with respect to plural pieces of output data. The pooling operation may mean an operation for selecting the maximum value from the plural pieces of output data or an operation for calculating an average value of the plural pieces of output data.

Further, in FIG. 10b, if a pooling size is 3×3, and a stride is 3, each of a plurality of PEs may transfer output data to a specific PE that includes a pooling unit. In this case, each of the plurality of PEs may transfer the output data to an adjacent PE once at the minimum to four times at the maximum (1, 2, 3, 4/(1-1), 2-1, 3-1, (4-1)/(1-2), 2-2, 3-2, (4-2)/(1-3), 2-3, 3-3, and 4-3), and the specific PE may generate one piece of output data by performing a pooling operation with respect to plural pieces of output data.

Figure 11A:
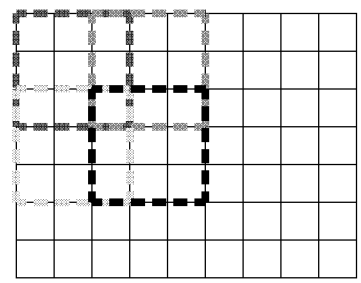
FIGS. 11a and 11b illustrate a diagram explaining a method in which a PE performs a pooling operation if a pooling size is larger than a stride according to another embodiment of the present disclosure.
Figure 11A:
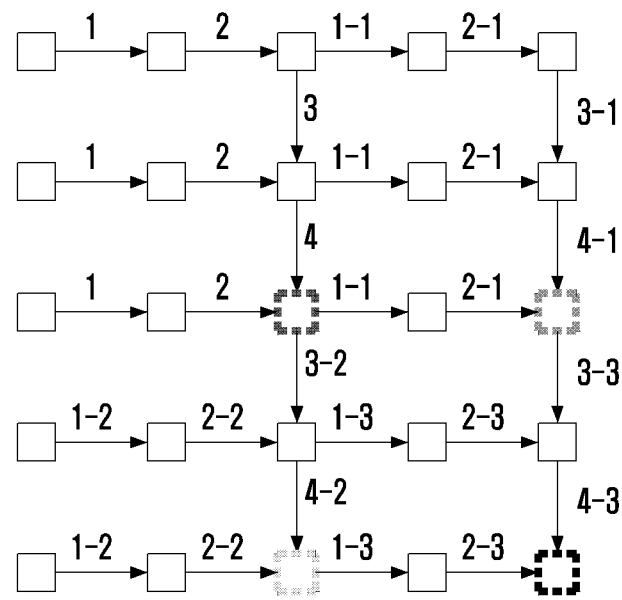
Figure 11B:
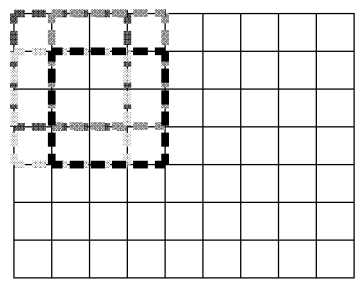
Figure 11B:
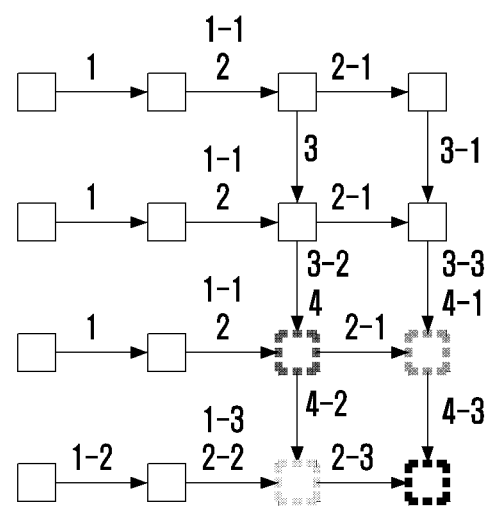

FIGS. 11a and 11b illustrates a diagram explaining a method in which a PE performs a pooling operation if a pooling size is larger than a stride according to another embodiment of the present disclosure.

In FIGS. 11a and 11b, unlike FIGS. 10a and 10b, the pooling size is larger than the stride, and thus re-performing of the pooling operation should be prevented. In this case, the re-performing of the pooling operation can be prevented through sharing of adjacent intermediate operation values among a plurality of PEs.

If a pooling size is 3×3, and a stride is 2, as illustrated in FIG. 11a, each of a plurality of PEs may transfer output data to a specific PE that includes a pooling unit. In this case, each of the plurality of PEs may transfer the output data to an adjacent PE once at the minimum to four times at the maximum (1, 2, 3, 4/(1-1), 2-1, 3-1, (4-1)/(1-2), 2-2, 3-2, (4-2)/(1-3), 2-3, 3-3, and 4-3). If the pooling size is 3×3, and the stride is 2, the intermediate operation value may be shared once on a boundary among the plurality of PEs in order to prevent re-performing of the pooling operation.

Further, if a pooling size is 3×3, and a stride is 1, as illustrated in FIG. 11b, each of a plurality of PEs may transfer output data to a specific PE that includes a pooling unit. In this case, each of the plurality of PEs may transfer the output data to an adjacent PE once at the minimum to four times at the maximum (1, 2, 3, 4/(1-1), 2-1, 3-1, (4-1)/(1-2), 2-2, 3-2, (4-2)/(1-3), 2-3, 3-3, and 4-3).

If the pooling size is 3×3, and the stride is 2, the intermediate operation value may be shared plural times on a boundary among the plurality of PEs in order to prevent re-performing of the pooling operation.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An accelerator for data reuse between a convolution layer and a non-linear layer, in a convolution neural network, the accelerator comprising:
   a plurality of processing elements (PEs);
   wherein, each PE of the plurality of PEs comprises:
   a first buffer configured to transfer input data to a second PE,
   a second buffer for the data reuse between the convolution layer and the non-linear layer, inside each PE, configured to transmit first output data that is based on processing the input data to a pooling unit outside the PE, and to store intermediate data, and
   an operation unit configured to generate the intermediate data by processing the convolution layer with respect to the input data, to transmit, to the second buffer, the intermediate data, to generate the first output data by processing the non-linear layer with respect to the intermediate data that is fed back from the second buffer inside each PE, to transmit, to the second buffer, the first output data; and
   the pooling unit configured to receive the first output data from multiple PEs, and to perform a pooling operation with respect to the first output data from multiple PEs, wherein the convolution layer and the non-linear layer are related to the data reuse of the intermediate data between the convolution layer and the non-linear layer.

2. The accelerator of claim 1, further comprising:
a third buffer, and
the pooling unit configured to transmit second output data pooled based on the first output data to the third buffer.

3. The accelerator of claim 2, further comprising a buffer controller configured to control the third buffer, and to transmit final data that is accumulated in the third buffer to an external memory if the final data is equal to or larger than a predetermined size.

4. The accelerator of claim 1, wherein the plurality of PEs are grouped into one or more matrixes of a predetermined matrix form.

5. The accelerator of claim 4, wherein the pooling unit is shared by each of the one or more matrixes.

6. The accelerator of claim 1, wherein at least one of the plurality of PEs further comprises the pooling unit configured to receive the first output data from multiple PEs, and to perform a pooling operation with respect to the first output data from multiple PEs.

7. The accelerator of claim 1, wherein the accelerator is controlled in accordance with a command from an external processor.

8. The accelerator of claim 1, wherein the first output data is transmitted to the outside, wherein the outside is any one of the plurality of PEs, the pooling unit, or an external memory.

9. A method for operating an accelerator for data reuse between a convolution layer and a non-linear layer that includes a plurality of processing elements (PEs) in a convolution neural network, the method comprising:
storing input data in a first buffer and transferring the input data to a second PE of the plurality of PEs;
generating intermediate data for data reuse between the convolution layer and the non-linear layer by performing processing on the convolution layer with respect to the input data, and storing the intermediate data in a second buffer;
generating first output data by performing processing on the non-linear layer with respect to the intermediate data that is fed back from the second buffer; and
transmitting the first output data from the second buffer to a pooling unit outside the PE,
wherein the convolution layer and the non-linear layer are related to the data reuse of the intermediate data between the convolution layer and the non-linear layer.

10. The method of claim 9, further comprising receiving plural pieces of output data that are transmitted from the plurality of PEs, performing a pooling operation with respect to the plural pieces of output data, and transmitting the output data to a third buffer.

11. The method of claim 9, further comprising grouping the plurality of PEs into one or more matrixes of a predetermined matrix form.

12. The method of claim 9, further comprising receiving the first output data from multiple PEs and performing a pooling operation with respect to the first output data from multiple PEs.

13. The method of claim 9, wherein the outside is any one of the plurality of PEs, the pooling unit, or an external memory.

14. The method of claim 10, further comprising transmitting final data that is accumulated in the third buffer to an external memory if the final data is equal to or larger than a predetermined size.

* * * * *